United States Patent
Oota et al.

(10) Patent No.: US 11,282,229 B2
(45) Date of Patent: Mar. 22, 2022

(54) INSPECTION APPARATUS

(71) Applicant: FANUC Corporation, Yamanashi (JP)

(72) Inventors: Yuusuke Oota, Yamanashi (JP); Shouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 164 days.

(21) Appl. No.: 16/381,384

(22) Filed: Apr. 11, 2019

(65) Prior Publication Data

US 2019/0325606 A1 Oct. 24, 2019

(30) Foreign Application Priority Data

Apr. 20, 2018 (JP) .............................. JP2018-081717

(51) Int. Cl.
*G06T 7/73* (2017.01)
(52) U.S. Cl.
CPC ..................................... *G06T 7/74* (2017.01)
(58) Field of Classification Search
CPC . G06T 2207/20081; G06T 2207/20084; G06T 2207/30108; G06T 7/001; G06T 7/74
See application file for complete search history.

(56) References Cited

U.S. PATENT DOCUMENTS

| | | | |
|---|---|---|---|
| 2008/0247630 A1 | 10/2008 | Horiuchi | |
| 2010/0188657 A1 | 7/2010 | Chen et al. | |
| 2011/0222647 A1 | 9/2011 | Sugita et al. | |
| 2013/0170734 A1* | 7/2013 | Uchiyama | G06K 9/46 382/149 |
| 2013/0177232 A1 | 7/2013 | Hirano | |
| 2016/0022238 A1* | 1/2016 | Park | G06T 7/0012 600/410 |
| 2016/0267673 A1* | 9/2016 | Grbic | G06T 19/00 |
| 2019/0282120 A1* | 9/2019 | Takeshima | G06N 3/08 |
| 2019/0362221 A1* | 11/2019 | Ando | G01N 21/9501 |

FOREIGN PATENT DOCUMENTS

| | | |
|---|---|---|
| CN | 101197301 A | 6/2008 |
| CN | 102192918 A | 9/2011 |
| CN | 102292805 A | 12/2011 |
| CN | 103207183 A | 7/2013 |
| CN | 104458755 A | 3/2015 |
| JP | 2005241310 A | 9/2005 |
| JP | 2006-105777 A | 4/2006 |
| JP | 2009-103508 A | 5/2009 |
| JP | 2010-159979 A | 7/2010 |

(Continued)

*Primary Examiner* — Manuchehr Rahmjoo
(74) *Attorney, Agent, or Firm* — Hauptman Ham, LLP

(57) ABSTRACT

It is possible to provide an inspection apparatus having a function of automatically checking a validity of an appearance inspection result without manual operation. An inspection apparatus for performing an appearance inspection using a plurality of images obtained by imaging an inspection target includes a determination unit that estimates an inspection result on each of the plurality of images based on a predetermined relationship model between the image and the inspection result and calculates a comprehensive inspection result based on reliability of each of the inspection results on the plurality of images.

11 Claims, 4 Drawing Sheets

(56) References Cited

FOREIGN PATENT DOCUMENTS

| | | |
|---|---|---|
| JP | 2011-7553 A | 1/2011 |
| JP | 2012-159491 A | 8/2012 |
| JP | 2013-142558 A | 7/2013 |
| JP | 2013-195368 A | 9/2013 |
| JP | 2014-6613 A | 1/2014 |
| JP | 2014-32122 A | 2/2014 |
| JP | 2014-174003 A | 9/2014 |
| JP | 2015-184143 A | 10/2015 |
| JP | 2015-197396 A | 11/2015 |
| JP | 2018-5500 A | 1/2018 |
| WO | 2009/054102 A1 | 4/2009 |

* cited by examiner

INSPECTION APPARATUS

RELATED APPLICATIONS

The present application claims priority to Japanese Patent Application Number 2018-081717 filed Apr. 20, 2018, the disclosure of which is hereby incorporated by reference herein in its entirety.

BACKGROUND OF THE INVENTION

1. Field of the Invention

The present invention relates to an inspection apparatus, and in particular, to an inspection apparatus having a function of automatically checking a validity of an appearance inspection result without manual operation.

2. Description of the Related Art

In an appearance inspection process of an inspection target (workpiece or the like after processing), an inspection by human eyes has been performed in the related art. In recent years, a method has been widely performed in which an image to be inspected is imaged with a camera and an inspection is performed by processing the image.

Recently, machine learning, for example deep learning, has been used for the appearance inspection. By using the machine learning, it is possible to exactly perform an inspection, such as determination of scratches and dents, for which a human being cannot define determination criteria precisely with numerical values.

JP 2011-007553 A discloses that an optical condition is changed for each defect, type, different scattered lights are detected by a plurality of detection units, and abnormality detection is performed by comparing the detected lights with learning data. JP 2011-007553 A also discloses that when an abnormality is detected, results of a plurality of discriminators can be comprehensively determined by OR (logical add) or majority voting.

JP 2009-103508 A discloses that a plurality of detectors detect scattered lights at different angles, the detected lights are compared with classifiers acquired by learning, and it is determined that a defect is present if there is any detector exceeding a threshold even at one location.

By the way, currently, it is necessary to manually check as to whether a result of an inspection using the machine learning is correct or not. For example, the result of the inspection by the machine learning and the result of the conventional inspection by human eyes are compared with each other, and the result of the inspection by the machine learning is checked. The result of the inspection by the machine learning may be influenced by imaging conditions and the like. Therefore, it has been necessary to manually evaluate reliability of the result of the inspection by the machine learning while changing the imaging conditions and the like many times by trial and error.

The present invention intends to solve the aforementioned problem and provide an inspection apparatus having a function of automatically checking a validity of an appearance inspection result without manual operation.

SUMMARY OF THE INVENTION

An inspection apparatus according to an embodiment of the present invention is an inspection apparatus for performing an appearance inspection using a plurality of images obtained by imaging an inspection target, and includes a determination unit that estimates an inspection result on each of the plurality of images based on a predetermined relationship model between the image and the inspection result and calculates a comprehensive inspection result based on reliability of each of the inspection results on the plurality of images.

In the inspection apparatus according to an embodiment of the present invention, when the reliability of the comprehensive inspection result does not satisfy a certain condition, the determination unit outputs an instruction to re-image the image and calculates the comprehensive inspection result again using the re-imaged image.

In the inspection apparatus according to an embodiment of the present invention, when the reliability of the comprehensive inspection result does not satisfy a certain condition, the determination unit outputs an instruction to re-image the image and calculates the comprehensive inspection result again by using the re-imaged image and the image imaged up to the previous time.

The inspection apparatus according to an embodiment of the present invention further includes an imaging condition decision unit that determines an imaging condition of the image, in which the imaging condition decision unit changes an imaging condition at the time of the re-imaging from an imaging condition at the time of previous imaging.

In the inspection apparatus according to an embodiment of the present invention, the imaging condition decision unit increases the number of images to be taken at the time of the re-imaging from the number of images to be taken at the time of previous imaging for an inspection part where the reliability of the inspection result does not satisfy a certain condition.

In the inspection apparatus according to an embodiment of the present invention, the imaging condition decision unit increases the number of images to be taken at the time of the re-imaging from the number of images to be taken at the time of previous imaging for an inspection part where the inspection result is not good.

In the inspection apparatus according to an embodiment of the present invention, the determination unit has a plurality of the relationship models and estimates the inspection result using the different relationship models from each other in accordance with each of the plurality of images.

In the inspection apparatus according to an embodiment of the present invention, the determination unit has a plurality of the relationship models and estimates the inspection result for the image at the time of the re-imaging, using the relationship model different from the relationship model for the image at the time of previous imaging.

According to the present invention, it is possible to provide an inspection apparatus having a function of automatically checking a validity of an appearance inspection result without manual operation.

BRIEF DESCRIPTION OF THE DRAWINGS

The foregoing and other objects and features of the present invention will become apparent from the following description of embodiments with reference to the accompanying drawings. Of those drawings.

DETAILED DESCRIPTION OF THE PREFERRED EMBODIMENTS

Figure 1:
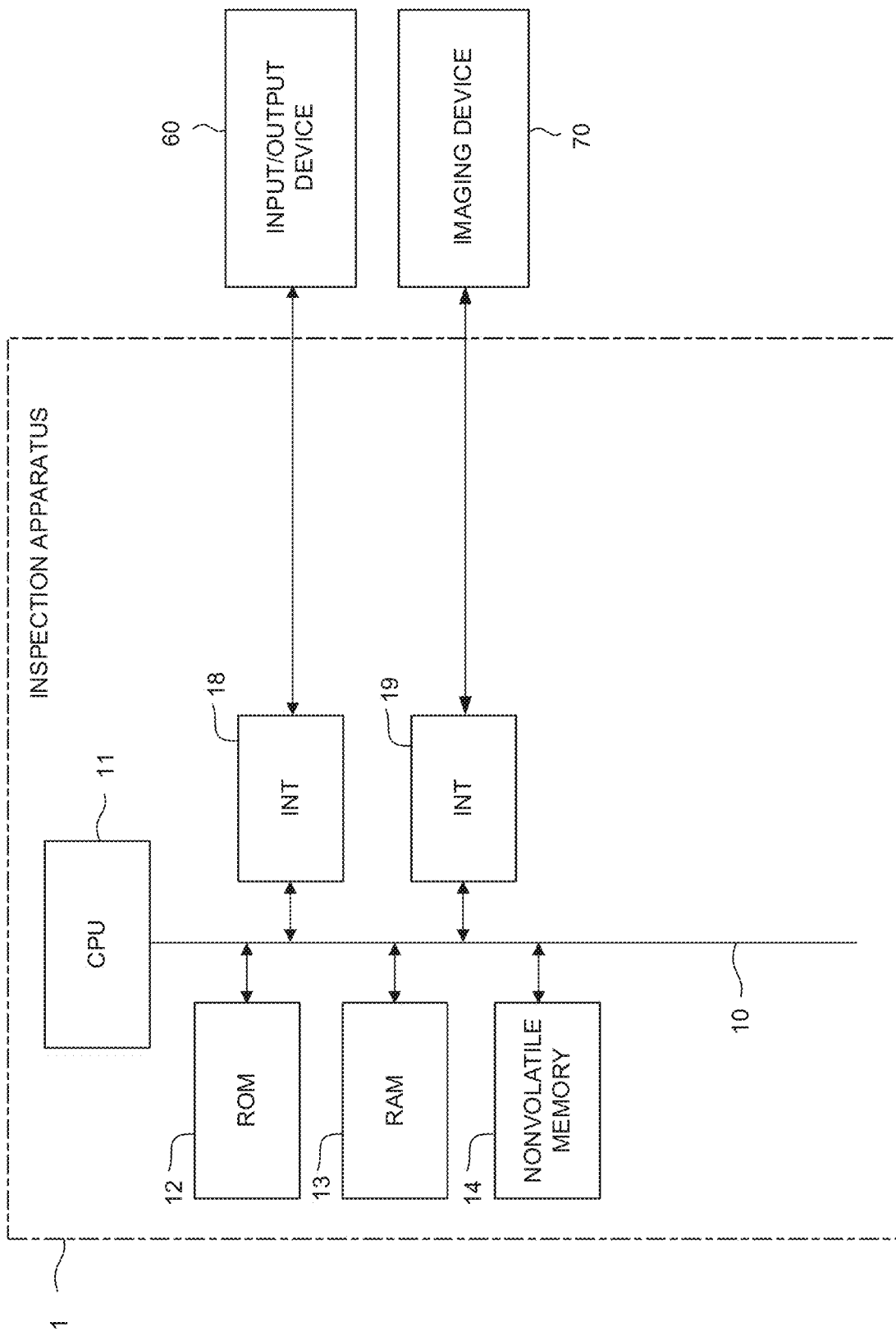
FIG. 1 is a diagram illustrating a hardware configuration of an inspection apparatus.

FIG. 1 is a schematic hardware configuration diagram illustrating main parts of an inspection apparatus 1 according to an embodiment of the present invention. The inspection apparatus 1 is, for example, an apparatus for performing an appearance inspection of a machined workpiece. The inspection apparatus 1 includes a CPU 11, a ROM 12, a RAM 13, a nonvolatile memory 14, an interface 18, an interface 19, a bus 10, an input/output device 60, and an imaging device 70.

The CPU 11 is a processor that controls the inspection apparatus 1 as a whole. The CPU 11 reads a system program stored in the ROM 12 via the bus 10 and controls the entire inspection apparatus 1 according to the system program.

The ROM 12 stores in advance a system program for executing various controls of a machine and the like.

The RAM 13 temporarily stores calculation data, input/output data, and the like.

The nonvolatile memory H is backed up, for example, by a battery not illustrated and maintains a storage state even when a power supply of the inspection apparatus 1 is cut off. The nonvolatile memory 14 stores data input from the input/output device 60, image data input from the imaging device 70 via the interface 19, and the like. The program and data stored in the nonvolatile memory 14 may be loaded in the RAM 13 at the time of execution and use.

The input/output device 60 is a data input/output device including display, a keyboard, and the like. The input/output device 60 displays information received from the CPU 11 via the interface 18 on the display. The input/output device 60 passes instructions, data, and the like input from a keyboard or the like to the CPU 11 via the interface 18.

The imaging device 70 is an apparatus that images an appearance of an inspection target and generates image data. The imaging device 70 includes, for example, a light, source than irradiates light to the inspection target, a camera that images the inspection target under a predetermined imaging condition, an output unit that outputs an imaging result of the camera as image data, and the like. The imaging device 70 may have a plurality of light sources and cameras. The imaging device 70 performs imaging according to an instruction received from the CPU 11 via the interface 19. The imaging device 70 passes the image data to the CPU 11 via the interface 19.

Figure 2:
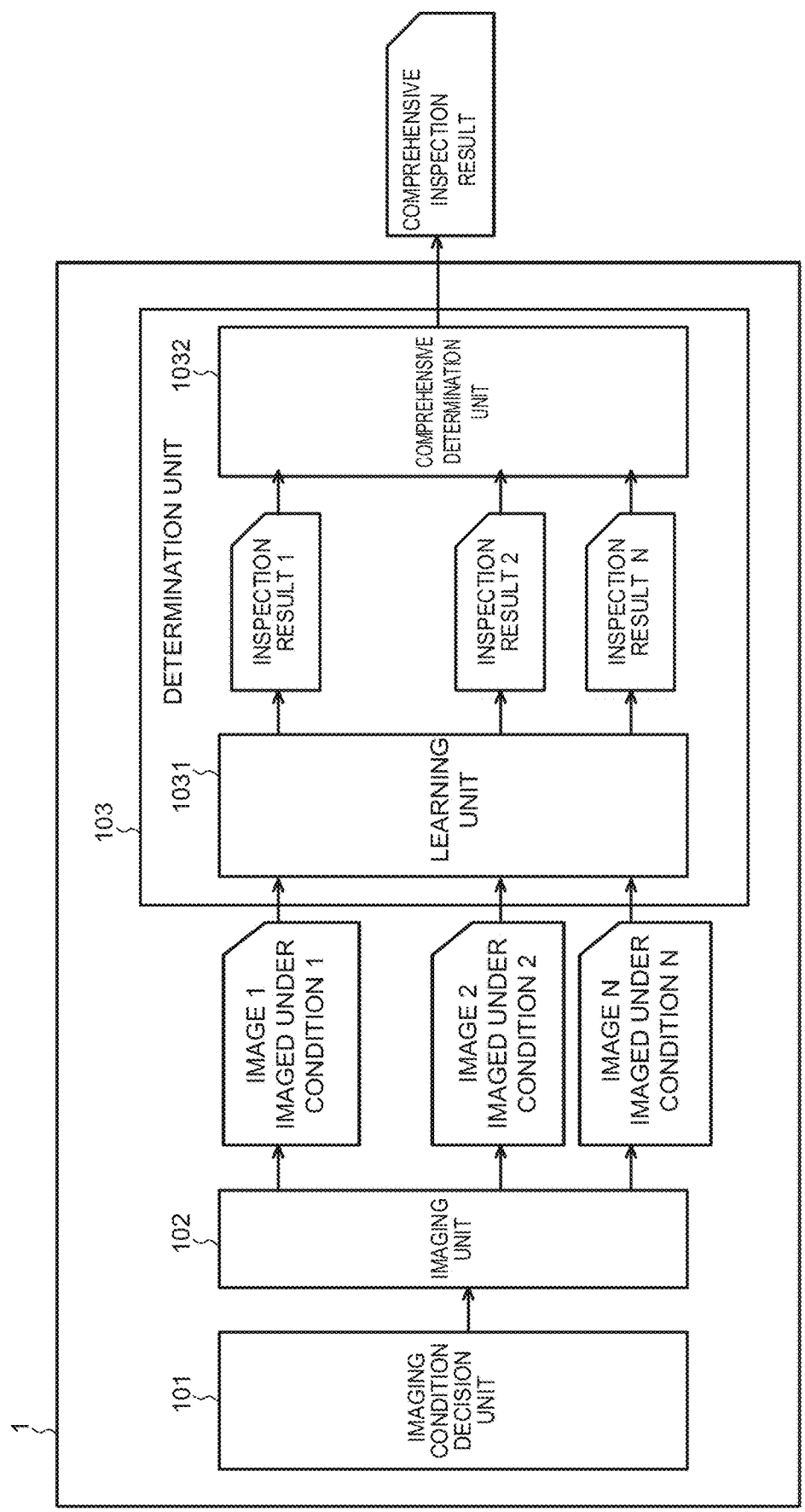
FIG. 2 is a diagram illustrating an embodiment of a functional configuration of the inspection apparatus.

FIG. 2 is a schematic functional block diagram of the inspection apparatus 1 according to a first embodiment. The inspection apparatus 1 includes an imaging condition decision unit 101, an imaging unit 102, and a determination unit 103. The various functions of the imaging condition decision unit 101, the imaging unit 102, and the determination unit 103 may be realized, for example, as a function of the CPU 11, or may be realized, for example, by the CPU 11 executing the program stored in the ROM 12, the RAM 13, and the nonvolatile memory 14.

The imaging condition decision unit 101 determines the imaging condition of the appearance of the inspection target. The imaging conditions include, for example, an angle of the light source or the camera with respect to the inspection target a positional relationship between the camera and the light source, a type (color, temperature, brightness, and the like) of the light source, and information on the number of pixels of the camera. In addition, in the case of using filter processing by an optical filter or software, the imaging conditions include information such as a type, an exposure time, a dynamic range, the number of the camera used for imaging, the number of images to be taken, and information as to which part of the inspection target is imaged.

The imaging unit 102 images an appearance of the inspection target according to the imaging condition determined by the imaging condition decision unit 101, and generates and outputs one or more image data.

The determination unit 103 includes a learning unit 1031 and a comprehensive determination unit 1032. The learning unit 1031 uses the image data output from the imaging unit 102 as an input and performs appearance inspection, that is, determination of quality by machine learning. Various known techniques can be adopted for the appearance inspection by the machine learning. The comprehensive determination unit 1032 determines the reliability of the inspection result by the machine learning. The comprehensive determination unit 1032 performs re-imaging or the like according to the determination result of the reliability.

Hereinafter, as an embodiment, an example of an operation of the inspection apparatus 1 will be described.

<Initial Imaging of Inspection Target>

The imaging unit 102 images an inspection target by using the imaging condition determined in advance by the imaging condition decision unit 101. In the present embodiment, the imaging unit 102 can perform the imaging a plurality of times while changing the imaging condition. For example, the imaging unit 102 can change a brightness of a light source and an angle of a light source or a camera with respect to the inspection target each time imaging is performed (three images are taken with changing the angle by 120 degrees, and the like). The imaging unit 102 outputs a plurality of image data obtained in this way with different imaging conditions.

<Inspection by Machine Learning and Comprehensive Determination>

The determination unit 103 inputs, to the learning unit 1031, the plurality of image data output from the imaging unit 102 with different imaging conditions.

The learning unit 1031 has a learning model constructed by a known machine learning method (typically supervised learning, unsupervised learning, or the like). It is assumed that the learning model learns s correlation between image data (or some feature quantity based on the image data) and an inspection result (a value indicating a result of quality determination) to a level that is reliable to some extent. That is, using the image data as an input, the learning model can output an inspection result estimated to have a strong correlation with the image data.

In the present embodiment, the learning unit 1031 automatically extracts an appropriate feature amount from the image data by the well-known deep learning, and outputs an inspection result having a strong correlation with the feature amount. The learning unit 1031 outputs a numerical value indicating a likelihood of failure (hereinafter, referred to as NG degree) as the inspection result. For example, the NG degree is an index indicating the likelihood of failure with the numerical value from 0 to 100, with the numerical value of 0 in a case where the inspection target is completely acceptable (good product) and the numerical value of 100 in a case where the inspection target fails completely (not-good product). The closer the NG degree is to 0 or 100, the higher the likelihood of acceptance or failure is, and the farther the NG degree is from 0 and 100, the lower the likelihood of acceptance or failure is. In other words, as the NG degree is farther from 0 and 100, it is not clearly determined whether the inspection result is acceptable or not. That is, the NG degree is an index representing reliability of the inspection result. The closer the NG degree is to 0 or 100, the higher the reliability of the inspection result is, and the farther the NG degree is from 0 and 100, the lower the reliability of the inspection result is.

An example of calculation method of the NG degree is shown. For example, in a construction phase of the learning model, it is assumed that a cluster of feature quantities of the image data that fails in the inspection are formed. At this time, it is assumed that the NG degree is 100 when a distance D between an input node (the feature amount of the image data to be inspected) and a center of gravity of the cluster is 0. It is assumed that the NG degree is 0 when the distance D between the input node and the center of gravity of the cluster is sufficiently large, specifically, when D≥a predetermined threshold Dth. When the distance D between the input node and the center of gravity of the cluster is 0<D<Dth, the NG degree can be calculated by a formula of (1−(D/(distance between the center of gravity of the cluster and Dth)))*100.

The learning unit 1031 inputs the plurality of image data output from the imaging unit 102 with different imaging conditions into the learning model, and obtains the inspection result corresponding to each image data. Since the plurality of image data have different imaging conditions, for example, how scratches appear or the like may be different. Therefore, there is a possibility that different NG degrees are output as an inspection result based on the plurality of image data.

Figure 3:
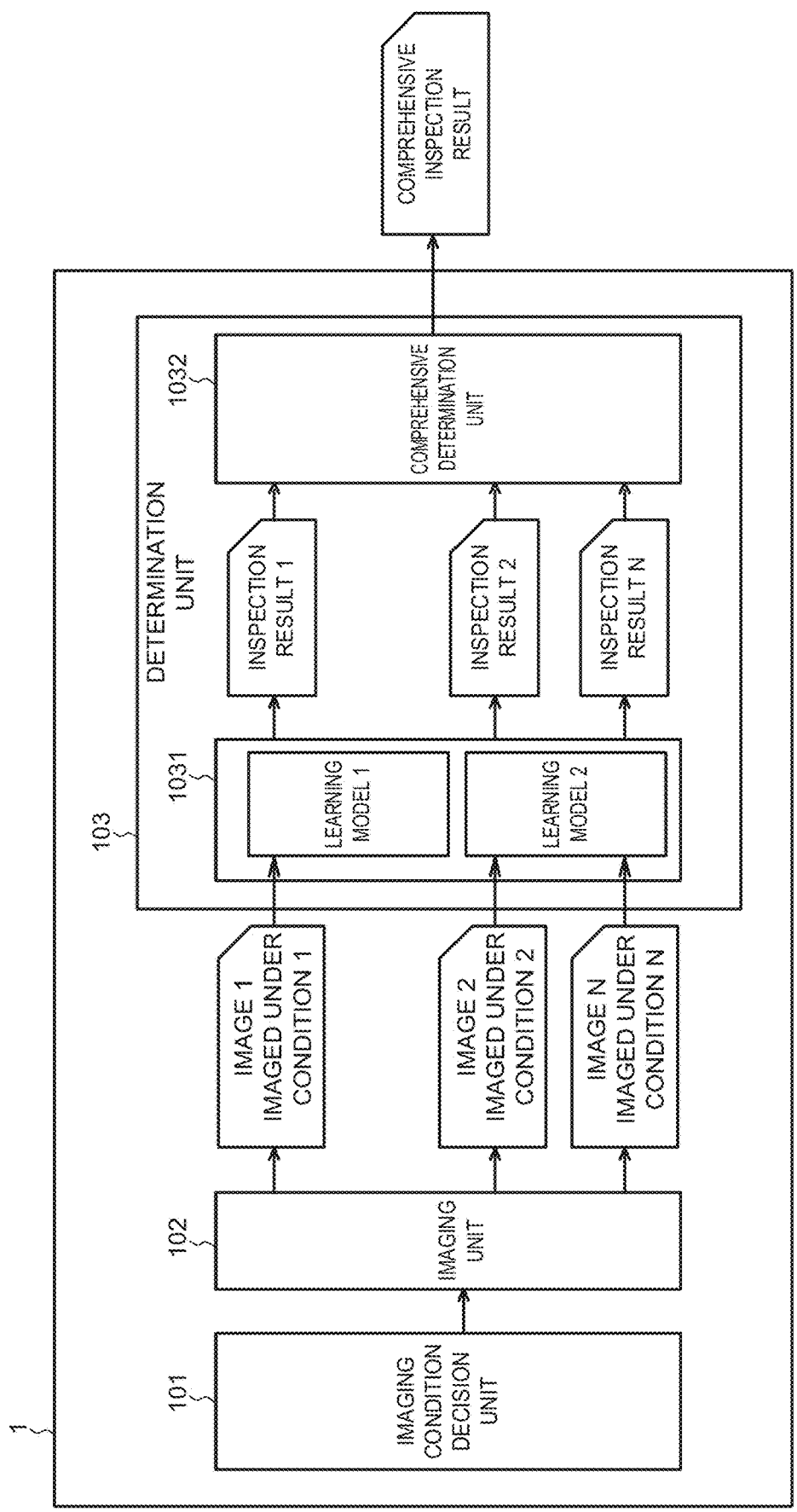
FIG. 3 is a diagram illustrating an embodiment of the functional configuration of the inspection apparatus.

The learning unit 1031 herein may input all of the plurality of image data to the same learning model or may input the image data to different learning models as illustrated in FIG. 3. For example, when a plurality of learning models optimized for a specific imaging condition are constructed, it is possible to perform the inspection using the learning model suited to the imaging condition of the image data to be input.

The comprehensive determination unit 1032 acquires a plurality of inspection results (for the same inspection target, but based on the plurality of image data with different imaging conditions) output from the learning unit 1031 and, based on the contents of the acquired results, determines a final inspection result. For example, the comprehensive determination unit 1032 classifies, based on the NG degree, the inspection results into three cases in which "not good" (NG degree is 81 to 100), "indefinite" (NG degree is 21 to 80), and "good" (NG degree is 0 to 20). If even one of the plurality of inspection results output from the learning unit 1031 includes "not good" (NG degree is 81 to 100), the comprehensive inspection result is determined to be "not good." Alternatively, majority voting is taken for the plurality of inspection results output from the learning unit 1031, and the most numerous one of the "not good", "indefinite", and "good" is set as a comprehensive inspection result. Alternatively, one of the plurality of inspection results output from the learning unit 1031 having the highest reliability, that is, one having the NG degree closest to 0 or 100 is adopted as the comprehensive inspection result. Alternatively, statistic amounts (for example, average value, median value, most frequent value, and the like) of the plurality of inspection results output from the learning unit 1031 are calculated, and determination of "not good," "indefinite" and "good" is performed with respect to the statistic amount to set a final inspection result. Alternatively, it is also possible to estimate a comprehensive inspection result by using a learning model that can receive the plurality of inspection results output from the learning unit 1031 as an input and output the comprehensive inspection result. In this learning model, a correlation between the comprehensive inspection result determined by various methods so far and the plurality of inspection results output from the learning unit 1031 based on the comprehensive inspection result is learned in advance by a known machine learning method.

When the comprehensive determination unit 1032 outputs "not good" or "good" as the comprehensive inspection result, a user can accept this as a final inspection result. The final inspection result has a high reliability, since it is evaluated as having a considerably high probability of being "not good" or "good" as a result of comprehensively considering inspection results based on the plurality of image data with different imaging conditions.

On the other hand, in a case where the comprehensive determination unit 1032 outputs "indefinite" as the comprehensive inspection result, it means that the inspection result with high reliability cannot be obtained comprehensively in imaging corresponding to the output. Therefore, the comprehensive determination unit 1032 instructs the imaging condition decision unit 101 and the imaging unit 102 so as to change the imaging condition and perform the imaging again.

<Re-Imaging>

Upon receiving a re-imaging instruction, the imaging condition decision unit 101 charges the above-described various imaging conditions used in the previous imaging and notifies the imaging unit 102 of the changed imaging conditions. The imaging condition decision unit 101 can randomly change the imaging conditions. Alternatively, the imaging condition decision unit 101 can change a predetermined imaging condition according to a predetermined rule. For example, the imaging condition decision unit 101 determines to change relative positions of an inspection target, a camera, and a light source each time re-imaging is performed. The imaging condition decision unit 101 rotates the camera or the light source around the inspection target, and charges the imaging condition so as to shift an angle of the camera or an angle of the light source with respect to the inspection target by a predetermined angle (for example, 60 degrees) from an angle of the previous imaging. The imaging condition decision unit 101 may change the angles of the camera or the light source with respect to the inspection target by rotating the inspection target on a table. Alternatively, the imaging condition decision unit 101 may increase the number of images to be taken (for example, three images) at the time of re-imaging, compared with the number of images to be taken (for example, one) at the time of an initial imaging.

In addition, the imaging condition decision unit 101 may evaluate the NG degree for each imaging part of the inspection target (the above-described evaluation method of the comprehensive inspection result can be applied) and change the imaging condition for each imaging part according to the NG degree. For example, the imaging condition decision unit 101 can adjust the imaging condition to increase information for determining the inspection result, for example, by increasing the number of images to be taken for an imaging part with low reliability (NG degree is 21 to 80, or the like). The imaging condition decision unit 101 can also obtain a more accurate inspection result by increasing the number of images to be taken for the imaging part decided as "not good," and the like.

After re-imaging, the determination unit 103 uses the re-imaged image data and evaluates the comprehensive inspection result again according to the above procedure. In this way, the inspection apparatus 1 repeatedly executes re-imaging and reevaluation of the comprehensive inspection result until the comprehensive inspection result with high reliability is obtained.

Figure 4:
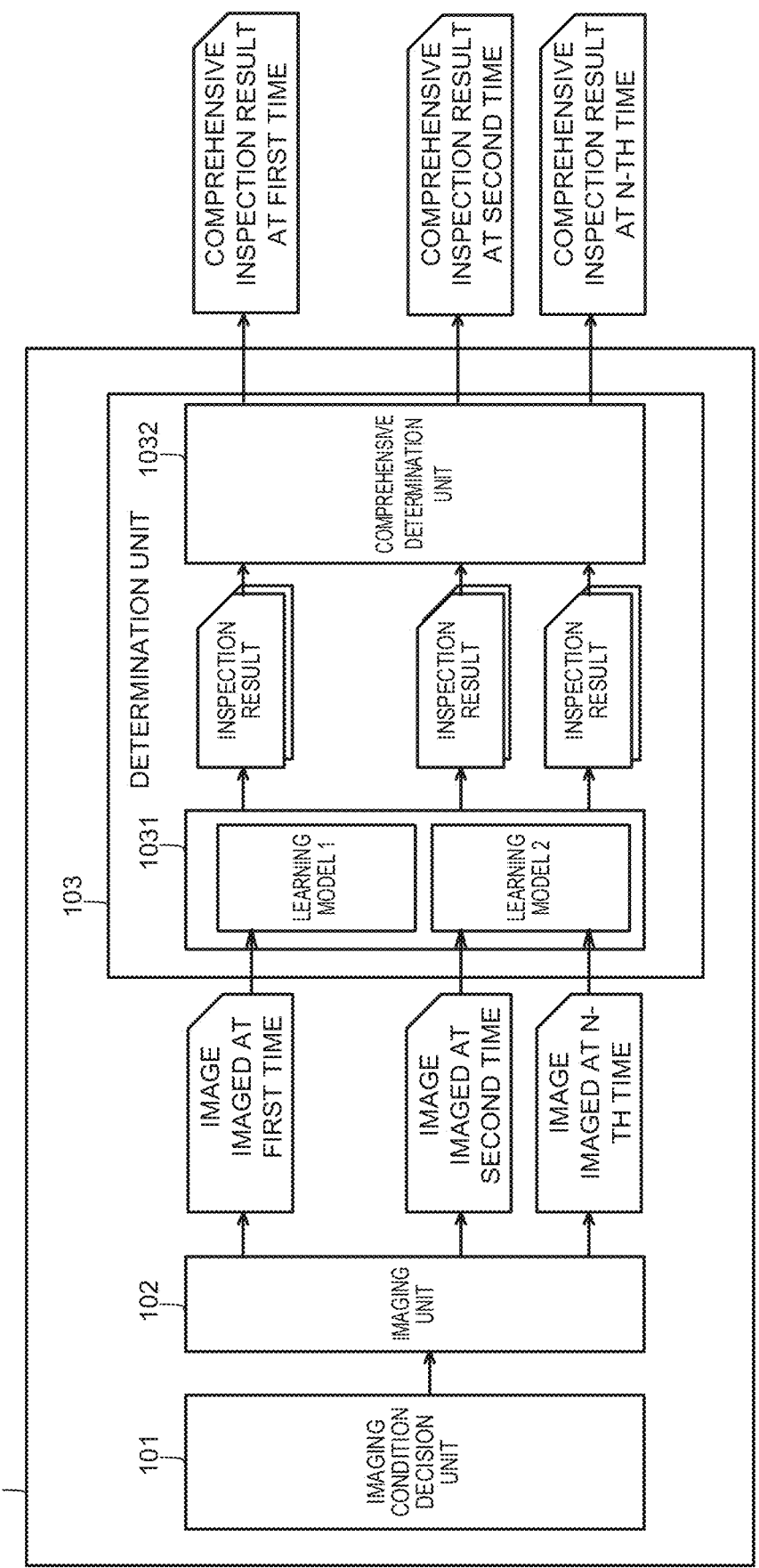
FIG. 4 is a diagram illustrating an embodiment of the functional configuration of the inspection apparatus.

The learning unit 1031 herein may use the same learning model in the first evaluation and the second and subsequent evaluations or may use different learning models as illustrated in FIG. 4. For example, if a learning model optimized for re-imaging is constructed, it is preferable to use a learning model optimized for re-imaging in the second and subsequent evaluations.

Alternatively, the inspection apparatus 1 may add image data by re-imaging and re-evaluate the comprehensive inspection result repeatedly until a comprehensive inspection result with high reliability is obtained.

In this case, the learning unit 1031 outputs the inspection result by using the image data obtained by the re-imaging. The comprehensive determination unit 1032 calculates the comprehensive inspection result by using both the inspection result estimated from the image data obtained up to the previous imaging and the inspection result estimated from the image data newly obtained in the re-imaging. As a result, a number of parameters of the image data used for the final decision can be increased, and the inspection result with high accuracy can be output.

According to the present embodiment, it is possible to automate decision of validity of the inspection result, which used to be performed manually in the related art, and the present embodiment makes it easier to introduce automatic appearance inspection (for example, appearance inspection by machine learning) without manual operation.

Although the embodiments of the present invention has been described above, the present invention is not limited to only the above-described embodiment but can be implemented in various modes by making appropriate changes.

For example, in the above-described embodiments, the learning unit 1031 performs the appearance inspection using the learning model constructed by machine learning, but the present invention is not limited thereto. The learning unit 1031 may perform the appearance inspection by any other automation method such as an expert system constructed on a rule basis, for example.

Further, in the above-described embodiments, the inspection apparatus 1 includes the imaging unit 102, but the present invention is not limited thereto, and a function corresponding to the imaging unit 102 may be provided outside the inspection apparatus 1. For example, the imaging condition decision unit 101 of the inspection apparatus 1 may acquire image data of an inspection target by controlling a robot including a camera and a light source. Alternatively, the imaging condition decision unit 101 of the inspection apparatus 1 may acquire image data of an inspection target by controlling an external imaging unit including a camera and a light source and having an information processing function.

The inspection apparatus 1 described in the above embodiments may be mounted on various information processing apparatuses. For example, the inspection apparatus 1 may be an inspection apparatus, a robot controller, a numerical controller of a machine tool, a PC to which a camera or a light source is connected, or the like.

The invention claimed is:
1. An inspection apparatus for performing an appearance inspection using a plurality of images obtained by imaging an inspection target, the inspection apparatus comprising:
   a determination unit that
      estimates an inspection result on each of the plurality of images based on a predetermined relationship model between the image and the inspection result, and
      calculates a comprehensive inspection result based on reliability of each of the inspection results on the plurality of images,
   wherein
   when the reliability of the comprehensive inspection result does not satisfy a certain condition, the determination unit
      outputs an instruction to re-image the image, and
      calculates the comprehensive inspection result again using the re-imaged image,
   the inspection apparatus further comprises an imaging condition decision unit that determines an imaging condition of the image,
   the imaging condition decision unit changes an imaging condition at the time of the re-imaging from an imaging condition at the time of previous imaging, and
   the imaging condition decision unit increases the number of images to be taken at the time of the re-imaging from the number of images to be taken at the time of previous imaging for an inspection part where the reliability of the inspection result does not satisfy a certain condition.

2. An inspection apparatus for performing an appearance inspection using a plurality of images obtained by imaging an inspection target, the inspection apparatus comprising:
   a determination unit that
      estimates an inspection result on each of the plurality of images based on a predetermined relationship model between the image and the inspection result, and
      calculates a comprehensive inspection result based on reliability of each of the inspection results on the plurality of images,
   wherein
   when the reliability of the comprehensive inspection result does not satisfy a certain condition, the determination unit
      outputs an instruction to re-image the image, and
      calculates the comprehensive inspection result again by using the re-imaged image and the image imaged up to the previous time,
   the inspection apparatus further comprises an imaging condition decision unit that determines an imaging condition of the image,
   the imaging condition decision unit changes an imaging condition at the time of the re-imaging from an imaging condition at the time of previous imaging, and
   the imaging condition decision unit increases the number of images to be taken at the time of the re-imaging from the number of images to be taken at the time of previous imaging for an inspection part where the reliability of the inspection result does not satisfy a certain condition.

3. An inspection apparatus for performing an appearance inspection using a plurality of images obtained by imaging an inspection target with different imaging conditions, the inspection apparatus comprising:
   a determination unit configured to
      estimate an inspection result on each of the plurality of images imaged with the different imaging conditions based on a learning model which is previously constructed by learning a correlation between (i) feature quantity based on data of the image and (ii) the inspection result representing a result of quality determination, and calculate a comprehensive inspection result based on reliability relating to a "No Good" or "Good" degree of evaluation for each of the estimated inspection results on the plurality of images imaged with the different imaging conditions, wherein
the reliability relating to the "No Good" or "Good" degree of evaluation is an index indicating the likelihood of failure with numerical value, wherein the inspection apparatus further comprises an imaging condition decision unit configured to determine and change an imaging condition of the images to be taken at the time of the re-imaging from the number of images to be taken at the time of previous imaging for an inspection part where the reliability of the inspection result does not satisfy a certain condition, according to the reliability relating to the "No Good" or "Good" degree of evaluation, and wherein the inspection apparatus is configured to re-image and re-evaluate the comprehensive inspection result until the comprehensive inspection result with a predetermined reliability is obtained.

4. The inspection apparatus according to claim 3, wherein in response to the reliability of the calculated comprehensive inspection result not satisfying a certain condition, the determination unit is configured to
output an instruction to re-image the image, and
calculate the comprehensive inspection result again using the re-imaged image.

5. The inspection apparatus according to claim 4, wherein the imaging condition decision unit is configured to increase the number of images to be taken at the time of the re-imaging from the number of images to be taken at the time of previous imaging for an inspection part where the inspection result is not good.

6. The inspection apparatus according to claim 4, wherein
the determination unit has a plurality of different learning models, the plurality of different learning models including the previously constructed learning model, and
the determination unit is configured to estimate the inspection result for the image at the time of the re-imaging, using a learning model different from the previously constructed learning model based on which the inspection result was estimated for the image at the time of previous imaging.

7. The inspection apparatus according to claim 3, wherein in response to the reliability of the calculated comprehensive inspection result not satisfying a certain condition, the determination unit is configured to
output an instruction to re-image the image, and
calculate the comprehensive inspection result again by using the re-imaged image and the image imaged up to the previous time.

8. The inspection apparatus according to claim 7, wherein the imaging condition decision unit is configured to increase the number of images to be taken at the time of the re-imaging from the number of images to be taken at the time of previous imaging for an inspection part where the inspection result is not good.

9. The inspection apparatus according to claim 7, wherein
the determination unit has a plurality of different learning models, the plurality of different learning models including the previously constructed learning model, and
the determination unit is configured to estimate the inspection result for the image at the time of the re-imaging, using a learning model different from the previously constructed learning model based on which the inspection result was estimated for the image at the time of previous imaging.

10. The inspection apparatus according to claim 3, wherein
the determination unit has a plurality of different learning models, the plurality of different learning models including the previously constructed learning model, and
the determination unit is configured to estimate the inspection result using the previously constructed learning models in accordance with each of the plurality of images.

11. The inspection apparatus according to claim 3, wherein the determination unit is further configured to classify, based on (1) the index indicating the likelihood of failure or (2) statistic amounts of a plurality of inspection results on the plurality of images imaged with the different imaging conditions, the comprehensive inspection result into "not good", "indefinite", and "good".

* * * * *